Aug. 28, 1934.  B. N. MUNSON  1,971,756
VEHICLE WHEEL
Filed Aug. 26, 1931   2 Sheets-Sheet 1

Inventor
BURR N. MUNSON,

Aug. 28, 1934.   B. N. MUNSON   1,971,756
VEHICLE WHEEL
Filed Aug. 26, 1931   2 Sheets-Sheet 2

Inventor
BURR N. MUNSON,
By Gillson, Mann & Co.
Attorneys

Patented Aug. 28, 1934

1,971,756

UNITED STATES PATENT OFFICE 1,971,756

VEHICLE WHEEL

Burr N. Munson, Muncie, Ind., assignor to Oscar U. Zerk, Chicago, Ill.

Application August 26, 1931, Serial No. 559,535

9 Claims. (Cl. 301—37)

This invention relates to wheels for vehicles and especially to those in which the hub and rim or felly are connected by relatively heavy spokes, as distinguished from "wire" spoked suspension wheels on the one hand, and "disk" wheels on the other hand. It is a matter of common observation that automobile wheels generally present an unclean and unkempt appearance after only a short period of ordinary use by reason of the adherence of dust, mud and all those substances commonly called dirt to the side surfaces thereof.

The principal object of my invention is to provide such a wheel, with an ornamental trim for its outer side which will present and will preserve during the use of the wheel, a clean and attractive surface. The present invention provides a wooden spoked or analogous compression wheel with an outer trim which will greatly enhance the ordinary general appearance of the wheel, will adapt the wheel to quicker, easier and more perfect cleaning and will protect the wheel from any injuries in service.

Briefly stated, this object is accomplished by fitting to the outside or outboard face of the wheel a trim which more or less covers the wheel body, including the felly, spokes and hub flange, the outer or displayed surface of which trim presents an attractive appearance that is in a high degree self preserving.

Further objects and advantages of the invention will more clearly appear from the detailed description hereinafter of the invention in certain preferred forms of embodiment.

One such embodiment is illustrated in the accompanying drawings in which—

Figure 1:
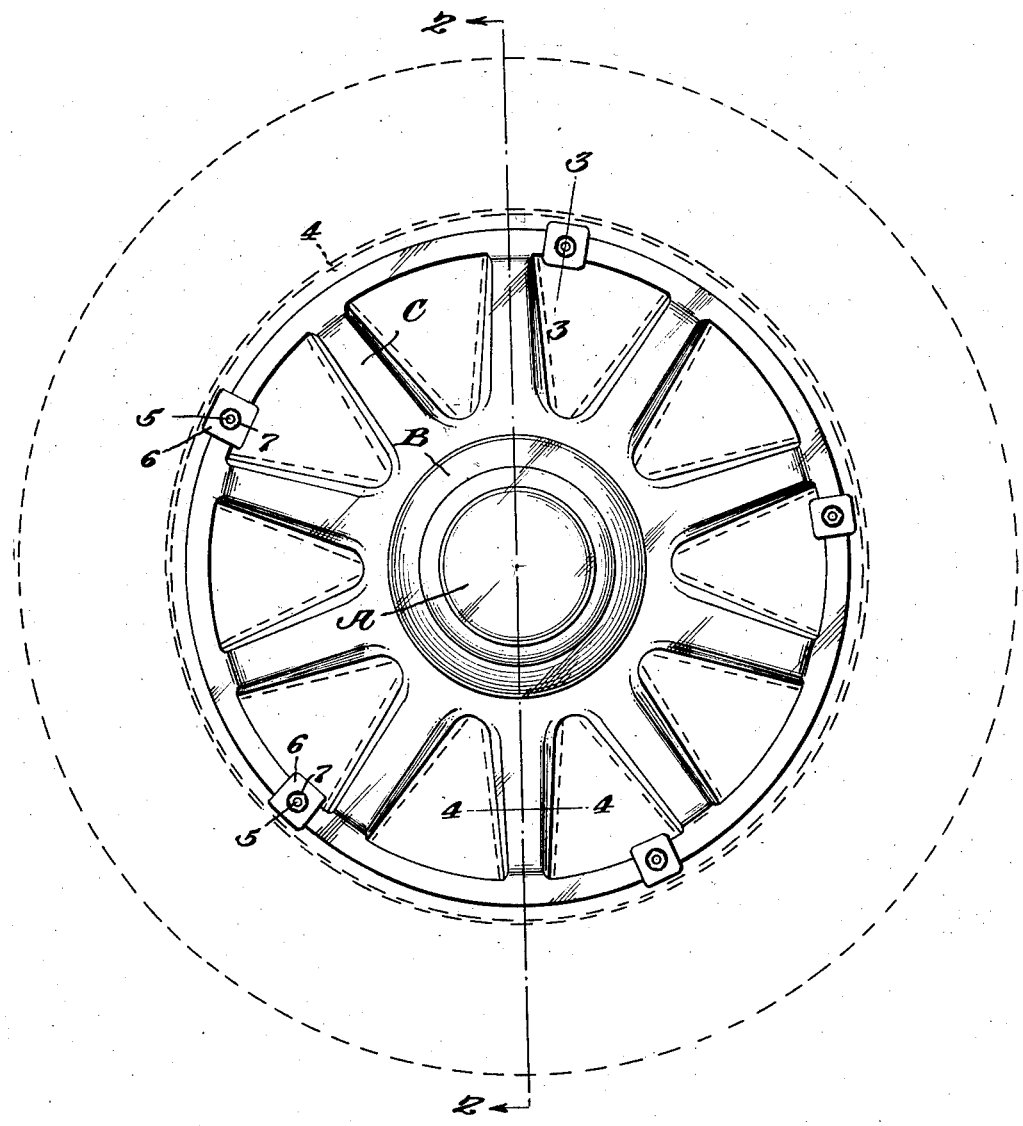
Figure 1 is a side, elevational view of the trim applied to a conventional automobile wheel shown in broken lines.
Figure 2:
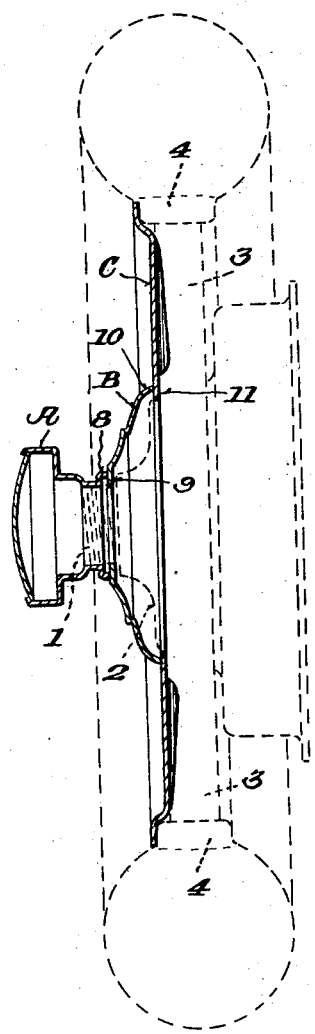
Figure 2 is a diametrical cross section through the wheel taken on the line 2—2 of Figure 1.

Referring now to the drawings, the trim comprises in general three portions, a portion A consisting of a more or less conventional hub cap screw threaded or otherwise secured to the customary projecting portion of the wheel hub 1, a portion B of generally annular form surrounding and masking the face of the hub and a third part C including portions lying against and substantially covering the outer side faces of the spokes 3 and the felly 4.

The number of the parts in which the entire trim is made depends to some extent upon the character of material of which the trim is fabricated. This material may be selected from a wide range of metals, of which I suggest ordinary sheet metal that adapts itself to economical chromium plating, or any of that class of materials commonly called "stainless" e. g. alloys containing chromium and equivalent metals which have the effect of imparting to ferrous bases the non-corrosive characteristics of the noble metals, as well as hard surfaces.

Figure 5:
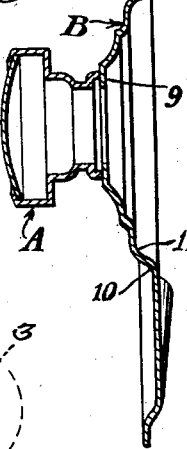
Figure 5 is a diametric sectional view taken through a trim which is another embodiment of my invention.
Figure 4:
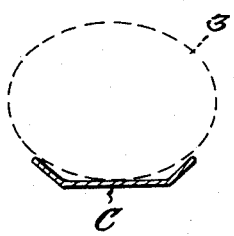
Figure 4 is an enlarged cross sectional view through one of the wheel spokes and the cooperating trim portion taken on the line 4—4 of Figure 1.

The most economical embodiment of the invention now known to me is obtained by making the trim of three separate portions A, B and C.

Where a somewhat higher cost is not objectionable, I prefer to fabricate the entire trim out of stainless material. I have found that the most economical use of such material is obtained by rolling in one piece that part of the portion C which engages the wheel felly, and by separately stamping each of the spoke engaging elements of the portion C. The several pieces thus produced may be welded together into one integral assembly, structurally equivalent to the single piece stamping illustrated in Fig. 5 which I employ when less expensive material is used. This piecemeal fabrication of portion C effects a saving of about five pounds of the costly stainless material.

Since a primary function of the trim contemplated by the invention resides in the self-preserving attractive appearance imparted to a wheel provided therewith, there may be an advantage in stainless material, because such a trim is homogeneous throughout its entire depth and can better resist the more severe action of flying stones and accidental blows by mechanics' tools, etc.

In the preferred form of trim the three separable portions A, B and C are all secured in place and to the wheel by a single connection at the hub and at a plurality of points about the felly.

Figure 3:
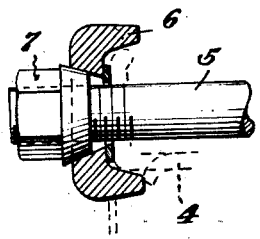
Figure 3 is a detail, enlarged cross sectional view taken on the line 3—3 of Figure 1.

The hub connection shown is the usual screw threaded engagement of hub and hub cap, and the felly connections, best shown in Figure 3, are effected by providing perforations through the felly engaging band of portion C which are adapted to receive the usual demountable rim securing studs 5. Lugs 6 and nuts 7 carried by studs 5 over the band portion C complete the secure attachment of the trim to the wheel. The several parts of the trim assembly are held together by cooperating outer flanges and inner margins on adjacent parts. Thus the hub cap A has a flange 8 which overlies the inner margin 9 of the portion B, and portion B in turn has a flange 10 which overlies the inner margin 11 of portion C.

What I claim, therefore, is—

1. An ornamental trim for a vehicle wheel provided with a felly, a nave construction and spokes normally exposed between the felly and the nave construction, comprising a peripheral portion adapted to engage and mask a side face of the felly, a plurality of distinct arms disposed radially inwardly therefrom and separated from each other by open gaps, each of said arms being adapted throughout its length to engage and mask the exposed portion of a spoke, and common means for holding said peripheral portion in masking engagement with the side face of the felly and the radial arms in similar engagement with the spokes of the wheel.

2. An ornamental trim for a vehicle wheel provided with a felly, a nave construction and spokes normally exposed between the felly and the nave construction, comprising a metal member including a peripheral portion for a side face of the felly and a plurality of distinct radial arms extending radially inwardly therefrom and separated from each other by open gaps, each of said arms being adapted throughout its length to engage and mask the exposed portion of a spoke.

3. An ornamental trim for a vehicle wheel provided with a felly, a nave construction and spokes normally exposed between the felly and the nave construction, comprising a metal member including a central portion for engaging and masking part at least of the nave construction, a peripheral portion for a side face of the felly, and an intermediate portion apertured at intervals to define a plurality of distinct radial arms each of which is adapted throughout its length to engage and mask the exposed portion of a spoke.

4. An ornamental trim for a vehicle wheel provided with a nave construction, spokes, and a peripheral member supported radially outwardly of the spokes, comprising a metal member including a peripheral portion for masking a side face of the peripheral member and a plurality of distinct radial arms extending radially inwardly therefrom and separated from each other by open gaps, each of said arms being adapted throughout its length to lie adjacent to and mask the exposed portion of a spoke.

5. An ornamental trim for a vehicle wheel provided with a nave construction, spokes, and a peripheral member supported radially outwardly of the spokes, comprising a metal member including a central portion for masking part at least of the nave construction of the wheel, a peripheral portion for masking a side face of the peripheral member, and an intermediate portion apertured at intervals to define a plurality of distinct radial arms each of which is adapted throughout its length to lie adjacent to and mask the outboard face of a spoke.

6. An ornamental trim for a vehicle wheel provided with a felly, a tire-carrying rim demountably secured thereto, a nave construction and spokes normally exposed between the felly and the nave construction, comprising a stamping including a peripheral portion adapted to mask at least a portion of the outboard face of the felly and an arm extending radially inwardly from said peripheral portion and adapted throughout its length to lie adjacent to and mask the exposed portion of a spoke, and means for holding said stamping in position on the wheel, said means serving also to secure the rim in position on the felly.

7. In combination with an automotive wheel of the artillery type, a sheet metal cover comprising a plurality of radially extending spoke-masking portions separated from each other by open gaps and a separate annular covering portion for the central portion of the wheel overlapping the radially inner extremities of the spoke-masking cover portions and means for securing all of said cover portions in assembled relation with said wheel.

8. An ornamental trim for a vehicle wheel provided with a nave construction, spokes, and a peripheral member supported radially outwardly of the spokes, comprising a metal member including a central portion for masking part at least of the nave construction of the wheel, and a portion extending radially from the central portion and apertured at intervals to define a plurality of distinct radial arms each of which is adapted throughout its length to lie adjacent to and mask the outboard face of a spoke.

9. An ornamental trim for a vehicle wheel provided with a nave construction, spokes, and a peripheral member supported radially outwardly of the spokes, comprising a metal member including a central portion for masking at least part of the nave construction of the wheel, and a portion in the form of a spider extending radially from the central portion to define a plurality of distinct radial arms each of which is adapted throughout its length to lie adjacent to and mask the outboard face of a spoke, and extending to substantially the radial outer end thereof.

BURR N. MUNSON.